United States Patent
Maxfield et al.

(10) Patent No.: US 10,641,403 B2
(45) Date of Patent: May 5, 2020

(54) VALVE FOR INFLATION/DEFLATION

(71) Applicant: Argon Technologies, Inc., Centerville, UT (US)

(72) Inventors: Matthew Maxfield, North Salt Lake, UT (US); Cory Tholl, Kaysville, UT (US)

(73) Assignee: ARGON TECHNOLOGIES, INC., Kaysville, UT (US)

( * ) Notice: Subject to any disclaimer, the term of this patent is extended or adjusted under 35 U.S.C. 154(b) by 73 days.

(21) Appl. No.: 15/633,445

(22) Filed: Jun. 26, 2017

(65) Prior Publication Data
US 2017/0370487 A1    Dec. 28, 2017

Related U.S. Application Data

(60) Provisional application No. 62/354,221, filed on Jun. 24, 2016.

(51) Int. Cl.
*F16K 15/03* (2006.01)
*F16K 15/20* (2006.01)
*F16K 15/18* (2006.01)
*F16K 31/524* (2006.01)

(52) U.S. Cl.
CPC .............. *F16K 15/20* (2013.01); *F16K 15/18* (2013.01); *F16K 31/52425* (2013.01); *F16K 31/52441* (2013.01); *Y10T 137/36* (2015.04); *Y10T 137/5153* (2015.04)

(58) Field of Classification Search
CPC ......... Y10T 137/3584; Y10T 137/3631; Y10T 137/3646; Y10T 137/784; Y10T 137/5153; Y10T 137/36; F16K 15/185
See application file for complete search history.

(56) References Cited

U.S. PATENT DOCUMENTS

| | | | |
|---|---|---|---|
| 3,565,099 A * | 2/1971 | Huber | F16K 5/0407 137/269.5 |
| 4,004,614 A | 1/1977 | Mackal et al. | |
| 4,296,772 A | 10/1981 | Nilsson | |
| 4,872,480 A | 10/1989 | Scaramucci | |
| 4,989,631 A * | 2/1991 | Harbin | F16K 5/0407 137/15.07 |
| 6,164,314 A | 12/2000 | Saputo et al. | |
| 6,237,621 B1 | 5/2001 | Chaffee | |

(Continued)

FOREIGN PATENT DOCUMENTS

| | | | |
|---|---|---|---|
| CN | 107366753 A | 11/2017 | |
| DK | PA 2016 00289 | * 5/2016 | ............. F16K 15/20 |

OTHER PUBLICATIONS

International Search Report from PCT International Application No. PCT/US2017/039550, dated Dec. 5, 2017, 10 pages.

(Continued)

*Primary Examiner* — Robert K Arundale
(74) *Attorney, Agent, or Firm* — Durham, Jones & Pinegar

(57) ABSTRACT

Apparatus and method of a valve assembly that may be integrated into an inflatable device. The valve assembly may include a valve that is rotatable within a housing. The valve may allow for one-way passage of air either into or out of the inflatable device depending on the configuration of the valve. The valve system may provide an easy way to both inflate and deflate an inflation device with minimal effort from a user.

19 Claims, 10 Drawing Sheets

(56) References Cited

U.S. PATENT DOCUMENTS

| | | | |
|---|---|---|---|
| 6,990,994 B2 * | 1/2006 | Reeb | F16K 15/205 |
| | | | 137/223 |
| 8,844,563 B2 | 9/2014 | Hawa | |
| 9,086,162 B2 | 7/2015 | Chaffee | |
| 2002/0083975 A1 * | 7/2002 | Chaffee | A47C 27/081 |
| | | | 137/223 |
| 2006/0108556 A1 * | 5/2006 | Rose | F16K 15/20 |
| | | | 251/149.8 |
| 2009/0183781 A1 | 7/2009 | Song | |
| 2012/0227818 A1 | 9/2012 | Steele | |
| 2017/0241557 A1 * | 8/2017 | Xia | F16K 7/17 |
| 2017/0328486 A1 * | 11/2017 | Arens | A47G 9/1027 |

OTHER PUBLICATIONS

Taiwan Examination Report from Taiwan Application No. 105123034, dated Sep. 26, 2018, 20 pages.
Chinese National Intellectual Property Administration, P.R.C., "First Office Action," application No. CN201610671374-5, dated Sep. 11, 2019.

* cited by examiner

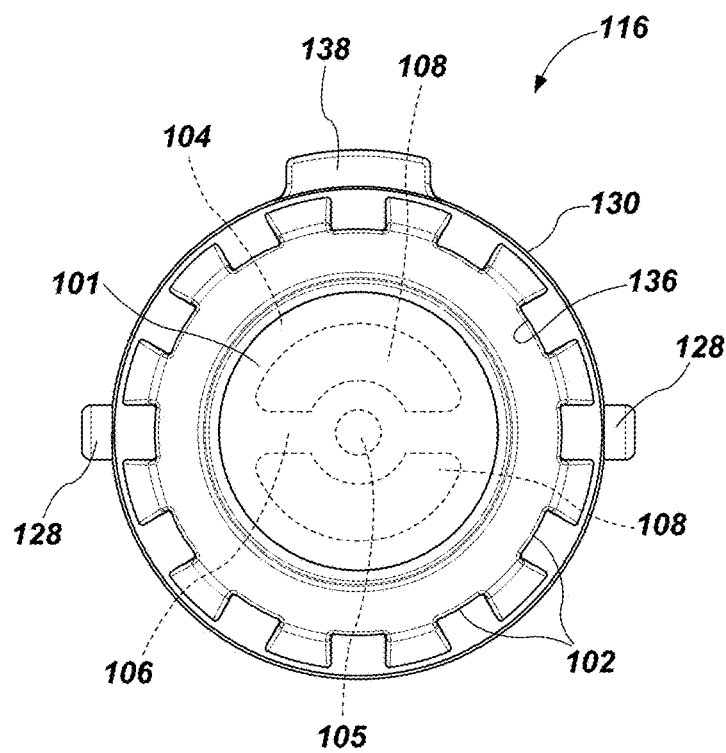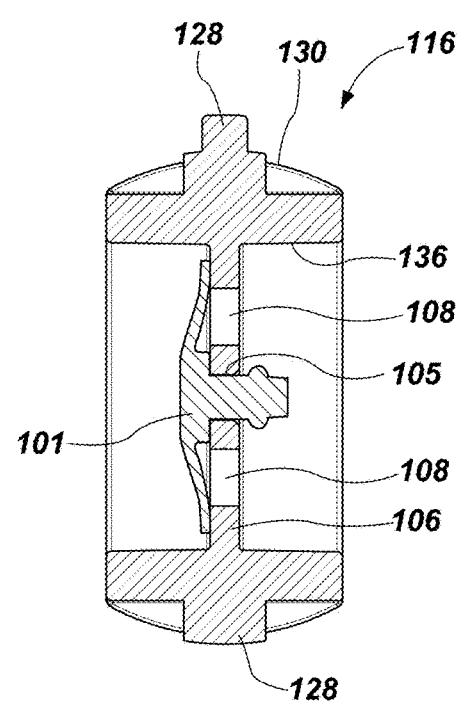
FIG. 6    FIG. 7
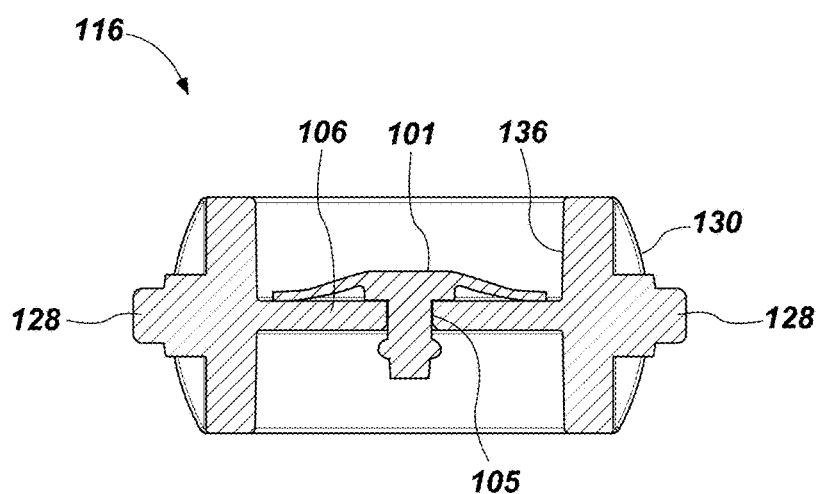
FIG. 8

VALVE FOR INFLATION/DEFLATION

CROSS-REFERENCE TO RELATED APPLICATIONS

This application claims priority to U.S. Provisional Patent Application No. 62/354,221 entitled VALVE FOR INFLATION/DEFLATION filed Jun. 24, 2016, which is incorporated herein by reference in its entirety.

TECHNICAL FIELD

This disclosure relates generally to a valve on, or integrated with, inflatable devices such as air mattresses and pads and, more specifically, a valve that can be used both to inflate and deflate an inflatable device. The valve may be rotatable such that air may flow in only a single direction and depending on the configuration of the valve may allow for inflation or deflation of an inflatable apparatus.

RELATED ART

As will be appreciated by any person who has ever used an inflatable device that most often the valves easily allow one-way flow of air either into or out of the inflatable device. It is also common to have an umbrella valve that will allow one way passage of air. It is also typical to have a push or twist valve that prevents air from escaping after blowing air into an inflatable, either by a user (or individual) or device such as a fan or air compressor. It is uncommon for a single valve to be able to provide both an easy one-way inflation and one-way deflation method.

Most inflatable pads include a valve that allows for passage of air into and out of the inflatable pad. One type of common valve is a valve that requires a push and twist. The valve works by pushing and/or twisting in a counter-clockwise direction which allows air to flow freely into and out of the pad. Once the pad is inflated to the desired stiffness, the user then pushes and/or twists in a clockwise direction to lock the valve and prevent air from escaping the pad.

Another common valve is the valve that in a static state prevents air both in and out of an inflatable device or pad. A user must deform the valve by applying pressure to the valve, usually from two different sides, or squeezing the valve, which opens up a pathway for air to pass freely into or out of the pad or other inflatable element such as a tube.

Another common valve is the umbrella valve as mentioned previously. The umbrella valve is commonly a rubber flap that pushes against a rigid frame with a small rubber extension member and mimics the appearance of an umbrella. The rubber flap pushes against the rigid frame by air pressure. Typically the umbrella valve allows air to flow into an inflatable pad and the air pressure within the pad pushes the rubber flap against the rigid frame preventing escape of air out of the pad. The user is able to overcome the pressure of air by pressing the rubber flap off of the rigid frame or out of the way from the rigid frame, thus allowing air to escape the pad.

A different approach when it comes to inflatable members with valves is to consider a single valve that allows air to flow freely in one direction, but allowing the valve to be easily rotatable so the one-way direction of airflow is simply decided by the user.

SUMMARY

This disclosure, in at least on aspect, relates to a valve system and more particularly, air valves for inflating and/or deflating an inflatable device, such as an air pad. The valve may include a housing that holds a valve. The housing may be integrated into the lining of the inflatable device and is secured to the inflatable device. "Integrated" for purposes of this disclosure means part of the inflatable device itself, non-removable and not separate from, or unitary. The valve is secured to the housing and it may be permanently secured or reversibly secured. The housing may also include a cap coupled to the housing which may provide an added feature for preventing the escape of air.

The valve may sit entirely or partially within the housing and may be rotatable about an axis. A valve rotation feature may allow the valve to freely rotate within the housing to allow air into the inflatable device or out of the inflatable device. A stop may be positioned within the housing to allow the valve to only rotate 180 degrees from an "inflation position" to a "deflation position" or vice versa. The valve may sit securely within the housing preventing any air from entering or escaping around the outer edge of the valve which engages an inner ring of the housing.

The valve may include a rigid center portion that engages an umbrella valve, or rubber flap, that lays flat against the center portion of the valve that allows one-way passage of air because the air pressure pushes the flap against the opening with the center portion preventing escape of air. The valve is configured in a way to allow for ease of inflation and deflation without unnecessary pressure, force, twisting, squeezing, or the like.

The valve may be used with any device that requires inflation or deflation and may be used with more than just inflation and deflation of with air; for example, water or other liquid may also be used in a like manner. It is contemplated that this valve may be used in any air mattress or sleeping pad, foam pads (also called self-inflate pads), inflatable water or snow toys, inflatable bladders, tires, dolls, toys, rafts, boats, pillows and the like. As the following detailed description will show, the one-way valve design will provide a tremendous benefit to self-inflatable pads because the valve will only allow air into the pad when the user wants air in and the valve only allows air out when the user wants air out. Furthermore, the valve contemplated herein provides a user with the unwanted air "escape" while attempting to inflate an inflatable device.

The valve system has a plurality of uses more than is set forth in this summary herein. Other aspects, as well as features and advantages of various aspects of the disclosed subject matter will become apparent to one of ordinary skill in the art form the ensuing description, the accompanying drawings and the appended claims.

BRIEF DESCRIPTION OF THE DRAWINGS

In the drawings:

FIG. 6 is top view of a valve;

FIG. 7 is a cross-sectional side view of the valve of FIG. 6;

FIG. 8 is a cross-sectional side view of the valve of FIG. 6;

DETAILED DESCRIPTION

The following description sets forth separate embodiments of a valve system for use in an inflatable device. The valve system may be utilized to inflate, deflate, or both, the inflatable device by allowing one-way passage of air (or other medium, such as water, used to inflate a device). In addition, the valve system described herein may allow for mass deflation by bypassing the one-way valve. A valve, when in a first configuration, may allow for passage of air into the inflatable device while preventing air from reversing through the valve out of the inflatable device. The valve, when in a second configuration, may allow for passage of air out of the inflatable device while preventing air from reversing through the valve in to the inflatable device.

Figure 1:
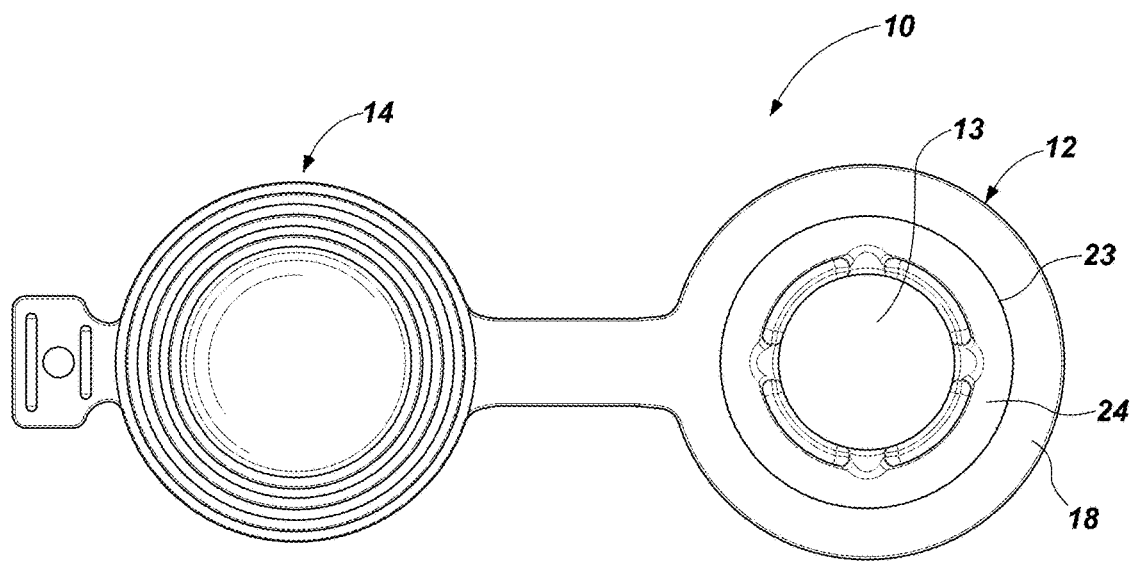
FIG. 1 is bottom view of a valve system with a housing and a cap.
Figure 2:
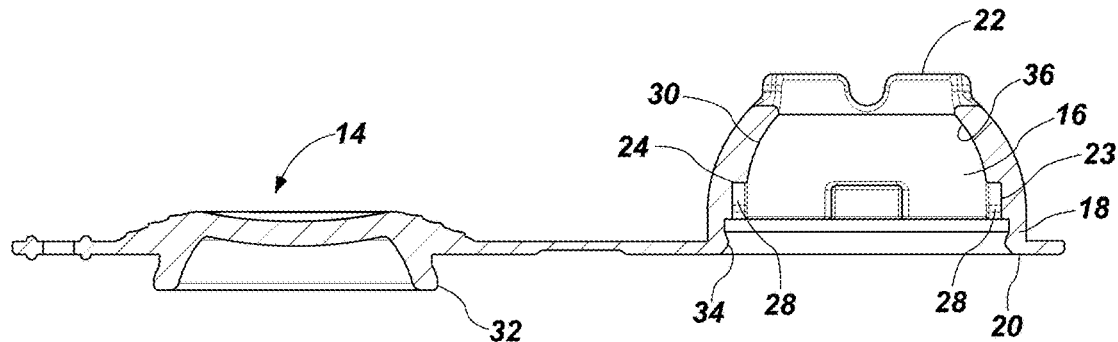
FIG. 2 is a cross-sectional side view of the valve system of FIG. 1 with a housing, a cap and a valve.

FIGS. 1 and 2 illustrate a valve system 10, with a housing 12, a cap 14 coupled to the housing 12 and a valve 16 positioned at least partially within the housing 12. The housing 12 may be integrated into or secured to an inflatable device around an outer ring 18 of the housing 12. The housing 12 may include an opening 13, or channel, passing partially and perhaps entirely through the body of the housing 12. The outer ring 18 may be welded, glued or secured by other airtight means to the inflatable device. The housing 12 may also include a top portion 20, or outward facing portion, and a bottom portion 22, or inward facing portion, wherein the inward facing portion 22 may reside within the inflatable device, wherein the opening 13, or channel, pass from the top portion 20 to the bottom portion 22. The inward facing portion 22 may be somewhat hemispherical in shape whereas the outward facing portion 20 may be substantially flat. The outward facing portion 20 may include a face 21 which may be positioned to be flush with the inflatable device or may be raised slightly above the body of the inflatable device.

The housing 12 may include an inner wall 23 and an inner ring 24 extending toward a central axis of the opening 13, wherein the inner ring 24 may be configured to receive the valve 16. The inner ring 24 may include at least two cutouts 26 within the inner ring 24 configured to receive at least one pin 28 that projects an outer wall 30 of the valve 16. The at least one pin 28 may include two or multiple pins 28 and may extend on opposite sides of the valve 16. The pins 28 may lie on a single access and may engage the cutouts 26 in a complementary fit and in a balancing fit which may be a press fit, snap fit or other that allows the pins 28 to freely rotate within the cutouts 26 without disengaging the cutouts 26. Allowing the pins 28 to freely rotate, in turn, allows the valve 16, to rotate within the housing 12 along the same axis in which the pins 28 are positioned.

A flange 31 may extend from the housing 12, and more particularly from the outward facing portion 20 and the face 21, to the cap 14. The flange 31 may be flush with the face 21 when the cap 14 is in an open configuration. The flange 31 may be narrower than the cap 14 and the housing 12 or it may be substantially the same width as either. The flange 31 may be comprised of the same material as the cap 14 or may be a more moldable, pliable, or flexible material (i.e. rubber) to allow the cap 14 to deform the flange 31 and engage the housing 12. The flange 31 may be easily manipulated to bend so the cap 14 may be secured over the outward facing portion 20 of the housing 12. The cap 14 may include a lip 32 that may slide within the outer ring 18 of the housing 12 and engage a circumferential flange 34 which may complement the lip 32. A force must be applied to the cap 14 for the lip 32 to overcome the circumferential flange 34 and reversible secure the cap 14 to the housing 12. Likewise, an opposite force must be applied to disengage the cap 14 from the housing 12. It will be appreciated that a similar engagement feature may exist wherein the cap 14 engages an outer edge of the outer ring 18 rather than the inner edge. The cap 14 may provide a secondary or backup air tight seal.

Figure 3:
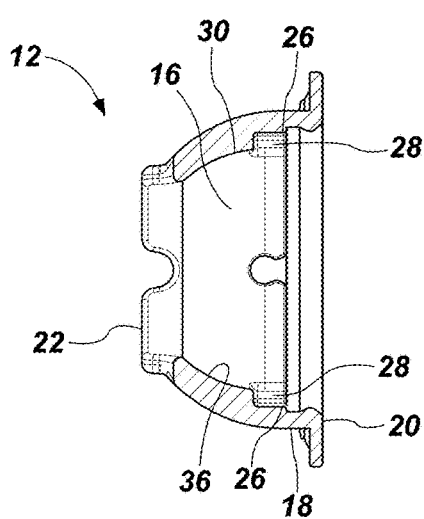
FIG. 3 is a cross-sectional side view of the valve system of FIG. 1 with the valve and housing.
Figure 4:
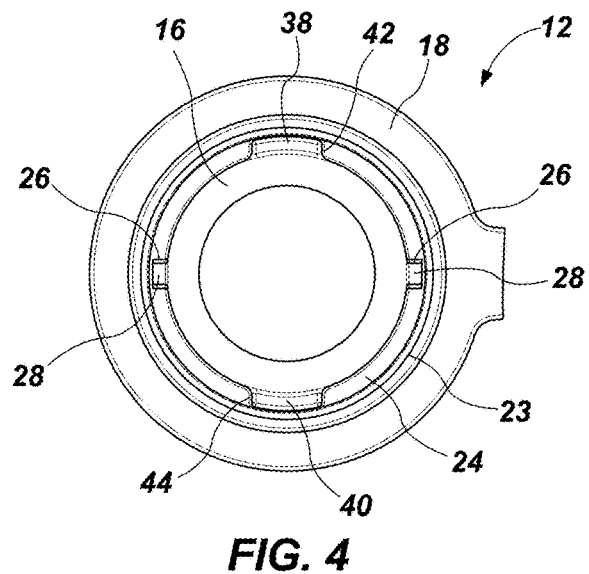
FIG. 4 is a top view of the valve system of FIG. 1 with the valve and housing.

Referring to FIGS. 3 and 4, the valve 16 may be substantially cylindrical, or may comprise spherical frustums, with the outer wall 30 and an inner wall 36. The outer wall 30, in addition to comprising at least two pins 28 extending in opposite directions from the outer wall 30, may include a first stop 38 and a second stop 40 which may extend in directions which may be non-parallel to the pins 28. The stops 38 and 40 may extend perpendicular or at substantially 90° from the pins 28. These stops 38, 40 may be barb-like protrusions or ridges that extend opposite one another. The housing 12 may include a first stop cutout 42, or first void, and a second stop cutout 44, or second void, to engage the stops 38, 40 and allow the stops 38, 40 to sit flush with the inner ring 24 of the housing. The stops 38, 40 may engage the first and second voids 42, 44 respectively and may reversibly secure the valve 16 in a first configuration and second configuration, respectively. The engagement may be through a press fit or snap fit or the like such that substantial user force must be applied to disengage the stops 38, 40 from the voids 42, 44.

The outer wall 30 of the valve 16 may engage against the inner ring 24 of the housing 12 forming a seal which may be airtight preventing the passage of air around the outer wall 30. An O-ring, or similar seal, may be utilized to form the seal or even a press-fit of other suitable materials between the inner ring 24 and outer wall 30 may be used to form the seal. An O-ring may engage the outer wall 30 with the inner ring 24. Rotating the valve 16 even slightly may break the seal and allow air to flow freely around the valve 16 through the opening 13.

While pins 28 may be utilized it will be appreciated that the rounded nature of the outer wall 30 may allow the valve 16 to engage the housing 12 at any point on the outer wall 30. With the housing 12 engaging the outer wall 30 in an infinite number of locations it would allow the valve 16 to rotate or spin on any axis of the valve 16 where two points on the outer wall 30 engage the housing 12, wherein the two points are opposite or nearly opposite each other on the outer wall 30 of the valve 16.

In this instance where the valve 16 is able to freely rotate about any number of axes, the valve 16 may be stabilized in the inflation configuration or deflation configuration by the sealing of an O-ring or other frictional fit that prevents air from freely passing at least in a one way direction into or out of the inflation device. The frictional fit stabilizes the valve 16 in the configuration a user desires while at the same time allowing free rotation of the valve 16 about any axis because of the frictional fit of the valve 16 within the housing 12.

Figure 5:
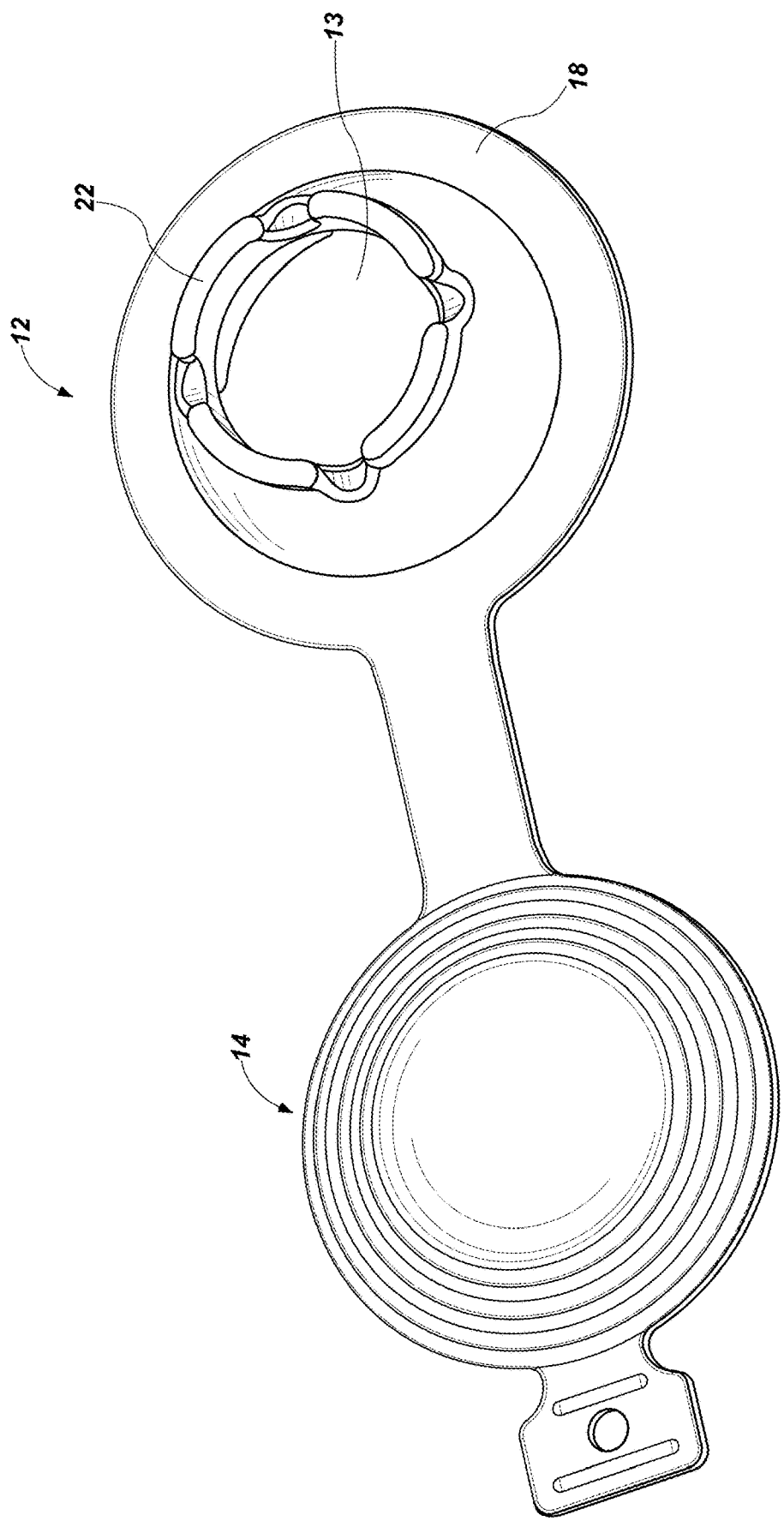
FIG. 5 is bottom perspective view valve system of FIG. 11 with the housing and cap.
Figure 9:
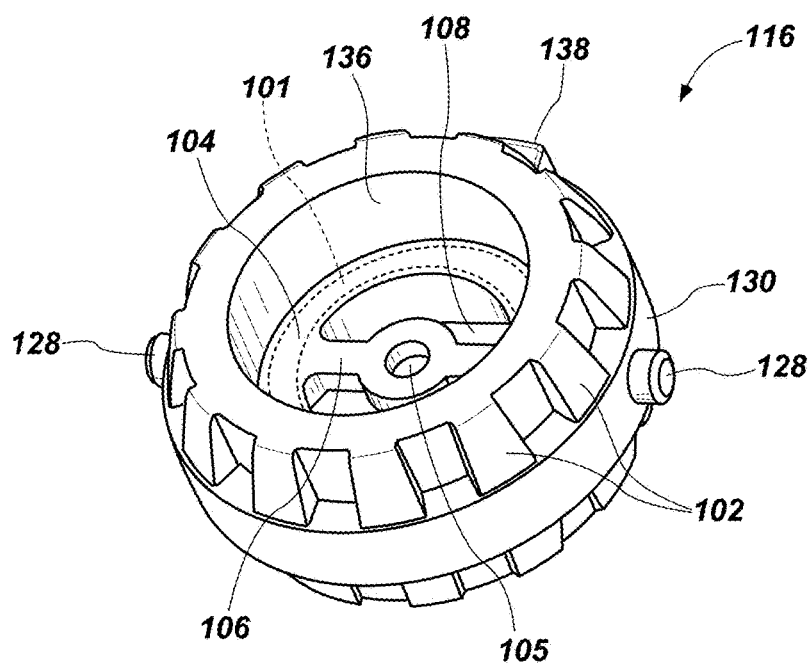
FIG. 9 is a perspective view the valve of FIG. 6.
Figure 10A:
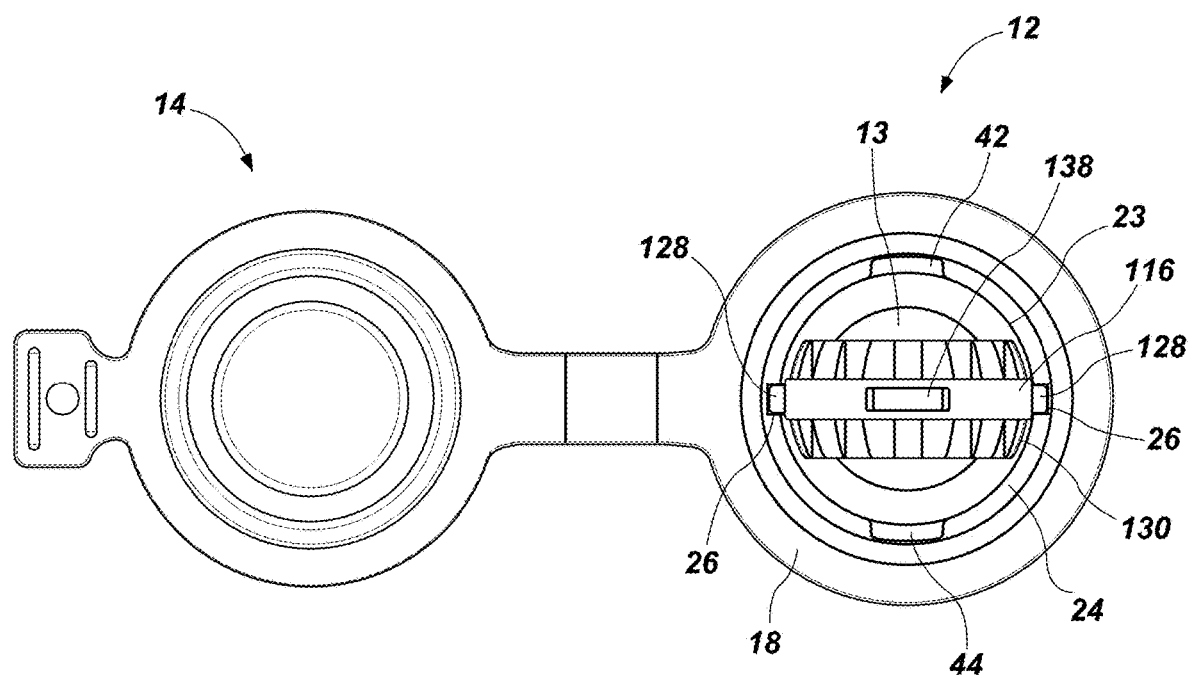
FIG. 10A is a top view of an alternate embodiment of the valve system of FIG. 1 with the valve rotated 90 degrees.
Figure 10B:
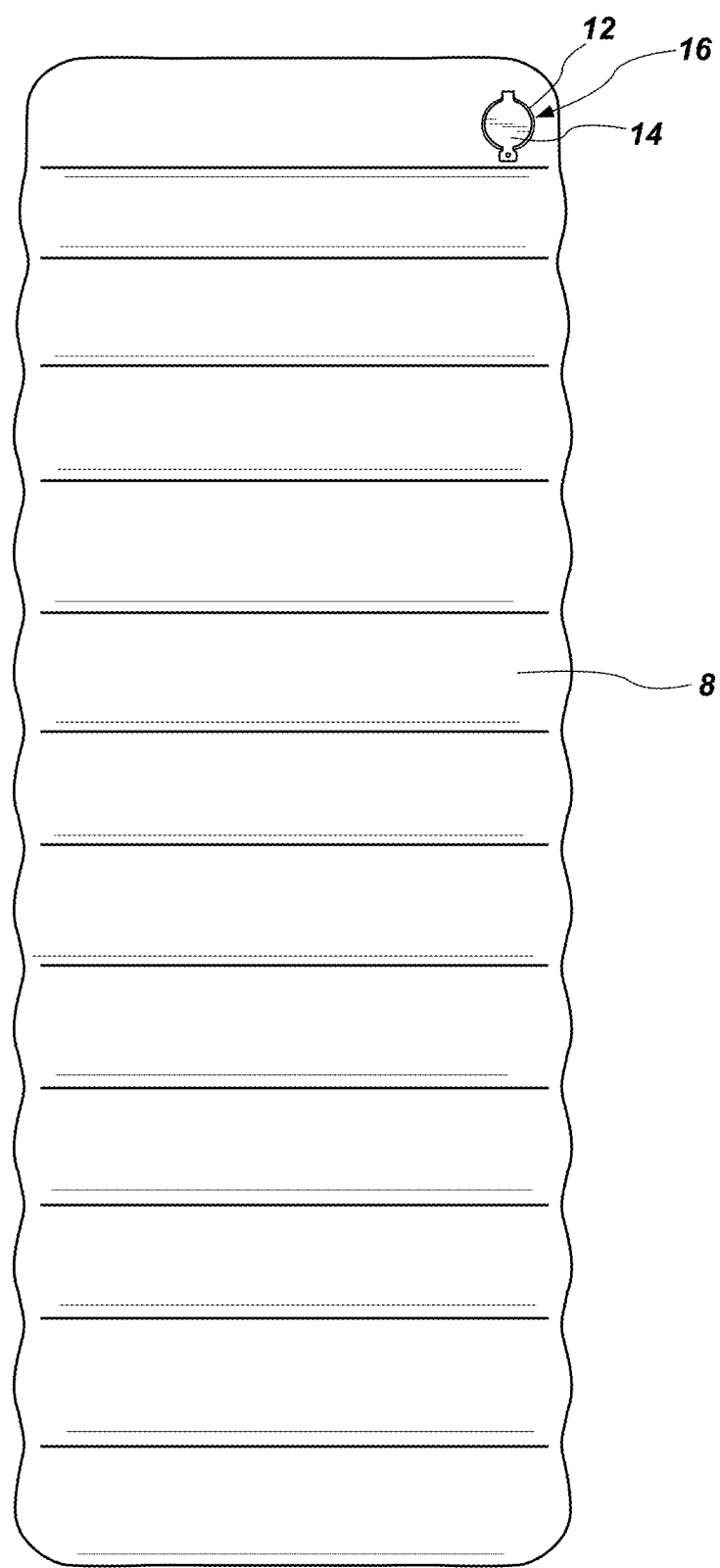
FIG. 10B is a top view of the valve system of FIG. 1 fixed to an inflatable device with a cap closed.
Figure 10C:
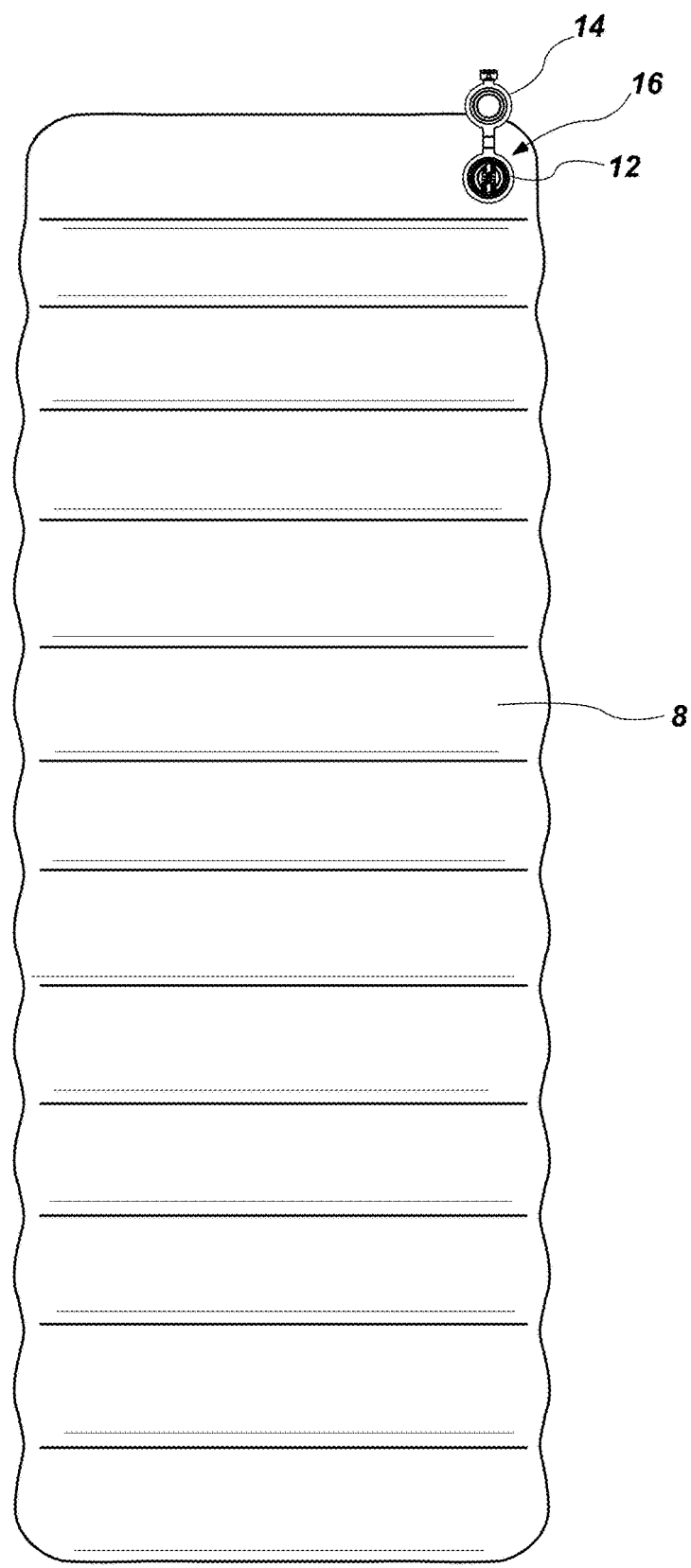
FIG. 10C is a top view of the valve system of FIG. 1 and the inflatable device with a cap closed.
Figure 10D:
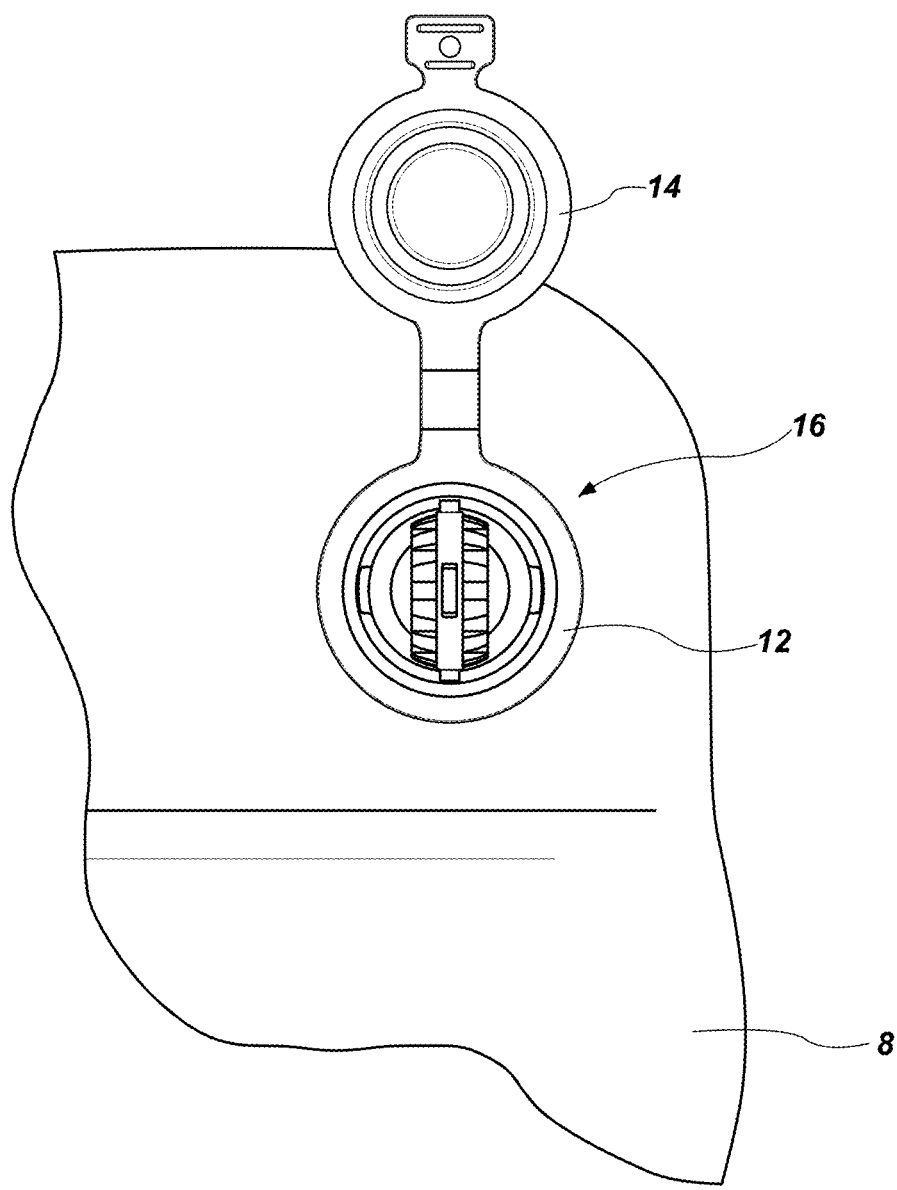
FIG. 10D is a magnified view of the valve system of FIG. 1 and FIG. 10C.

Referring to FIG. 5, the inward facing portion 22 is depicted with a hemispherical shape with a spherical frustum. It will be appreciated that the shape is not restrictive of the valve system and is only one rendition of a possible inward facing portion 22. While the figure may depict a hemispherical shape any polygonal or similar rounded-shape may be used. Furthermore, the inward facing portion 22 may be a cage, solid with an opening for air passage, or other similar design which projects into the inflatable device 8 to allow easy inflation/deflation and rotation of the valve 16 without getting "stuck" or without restriction from the inside of the inflatable device 8.

The cap 14 may include a tab 46 extending from a body of the cap 14. The tab 46 may allow a user to easily overcome the necessary force to pull the cap 14 from the housing member 12.

Referring to FIGS. 6-9, an alternate embodiment of a valve 116 is depicted. The valve 116 may include an inner wall 136 and an outer wall 130. Similar to the previous embodiments, pins 128 may extend from the outer wall 130 away from a central axis of the valve 116 and in opposite directions. The valve 116 may include ridges 102 that may protrude inwardly from the outer wall 130 circumferentially around the valve 116. Alternatively the ridges 102 may protrude outwardly from the inner wall 136. The valve 116 may also include a central ring 104 with a support member 106 extending across the central ring 104 creating two windows 108 to allow for passage of air through the central ring 104. The support member 106 may extend from opposite ends of the inner walls 136 of the valve 116. An aperture 105 may be positioned within the support member 106 that may be configured to receive and engage a post of a cover 101 or stopper. The cover 101 may be comprised of a highly pliable material, such as rubber. The cover 101 may be substantially similar to an umbrella valve. The post may include a bulbous section preventing withdraw of the post from the aperture 105 in one direction, unless overcome by substantial force. The cover 101 may prevent withdraw of the post from the aperture 105 from an opposing direction. In a first configuration, the cover 101 may allow for air to pass through in a one-way direction where air may freely pass one-way, through the windows 108, in the direction from the post toward the cover into an inflatable device, thus air flows freely from outside the inflatable device to inside. Air does not pass in the direction from the cover 101 to the post because the air pressure on the cover side of the valve 116 pushes the cover 101 against the central ring 104 and the support member 106 creating an air tight seal. The air tight seal may be overcome with some force provided by a user.

In a second configuration, the valve 116 is rotated within the housing 12 and air passes in the same direction as previously described; however, because the valve 116 has been rotated, air flows, in a one-way direction, freely from inside the inflatable device 8 to outside.

A stop 138 may be barb-like protrusions or ridges that extend from the outer wall 130 in a direction that may be at a 90 degree angle from the pins 128. The stop 138 may sit flush with the inner ring 24 of the housing 12 in the first stop cutout 42. While this embodiment may depict a single stop 138, multiple stops may be used with complementary cutouts in the housing 12. The first stop cutout 42 and second stop cutout 44 may each individually engage the single stop 138 depending on the configuration of the valve 116, whether in a first configuration or a second configuration. Similar to the previous embodiment, reversibly securing the stop 138 into one of the cutouts 42, 44 is done in a like manner as previously described herein.

Referring to FIG. 10, a third configuration is depicted of a valve 116 partially rotated within a housing 12. The partial rotation of the valve 116 may create, or expose, openings 13 on either side of the valve 116. These openings 13 may allow air to enter or escape freely, or as previously discussed, allow for mass deflation of the inflatable device.

The housing 12, cap 14, and valve 16 may be circular or cylindrical in shape so that each may complement the other. It will be appreciated that the housing 12, cap 14, and valve 16 may be any polygonal, conical, cylindrical, or spherical shape that may accomplish the same design as represented herein.

Figure 11:
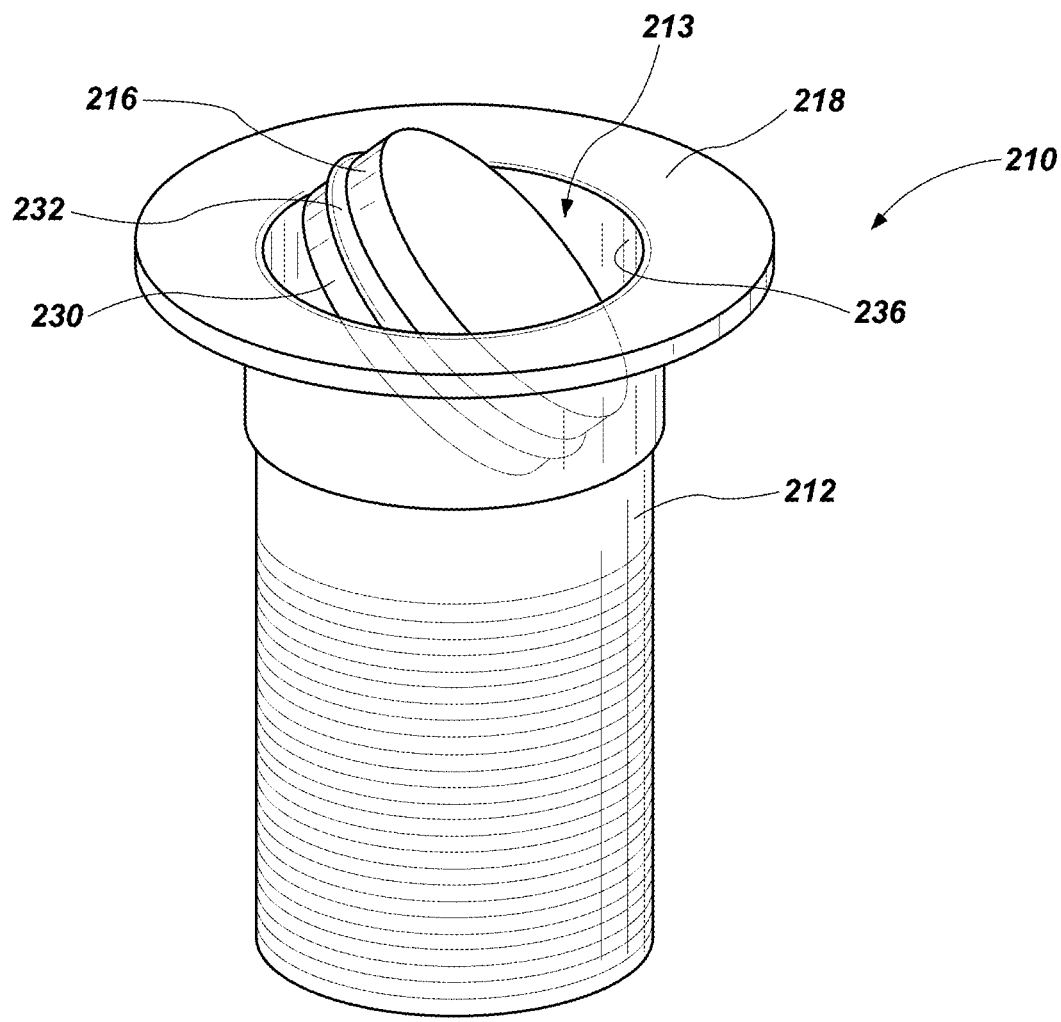
FIG. 11 is a perspective view of an alternate embodiment of a valve and housing.

Referring to FIG. 11, a separate embodiment of a valve system 210 is depicted with a housing 212 and an outer ring 218. The housing 212 may be longer or more cylindrical than the previous embodiments providing for a longer opening 213 for the passage of air. A valve 216 may include an outer wall 230 with an O-ring 232 that seals the opening 213. The valve 216 may be rotatable on any axis and engages an interior wall 236 of the housing 212 at any number of locations to allow rotation of the valve 216.

Alternatively, the valve 216, or a valve of a separate embodiment, may be removable from the housing 212 and rotated 90 degrees, or any angle desired by a user, and positioned back into the housing 212.

Figure 12:
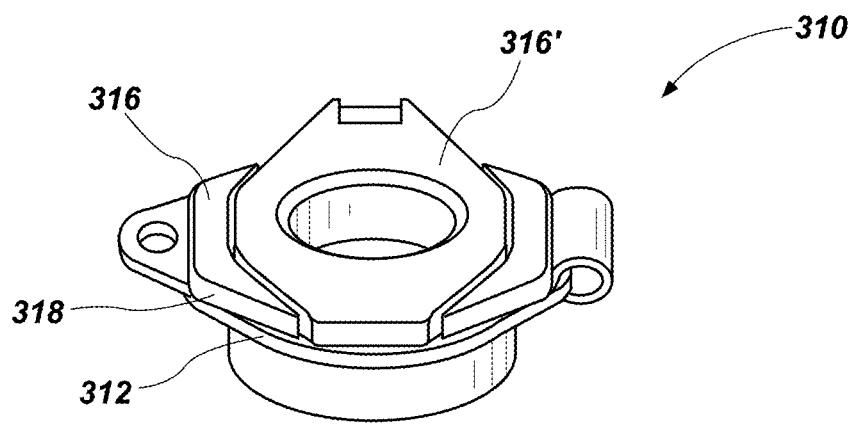
FIG. 12 is a perspective view of an alternate embodiment of a housing with multiple caps which may create a valve.

Referring to FIG. 12, a separate embodiment of a valve system 310 is depicted. The valve system 310 includes a housing 312 with an outer ring 318. The valve system 310 may also include a first valve 316 and a second valve 316' that change the configuration of one-way airflow by plugging or unplugging the separate valves 316, 316'. The valves 316, 316' may engage the housing 312 like flaps. The first valve 316 and the second valve 316' may each include a flange securing the respective valves 316, 316' to the housing 312. The flanges of the valves 316, 316' may be aligned or may be unaligned. The valves 316, 316', when engaged with the housing, may comprise a common central axis that aligns with an opening of the housing 312. The first valve 316 may plug into an opening of the housing 312 and the second valve 316' may plug into an opening of the first valve 316. Similar to the previous embodiment, if both valves 316, 316' are disengaged from the housing 312, mass deflation may occur.

Figure 13:
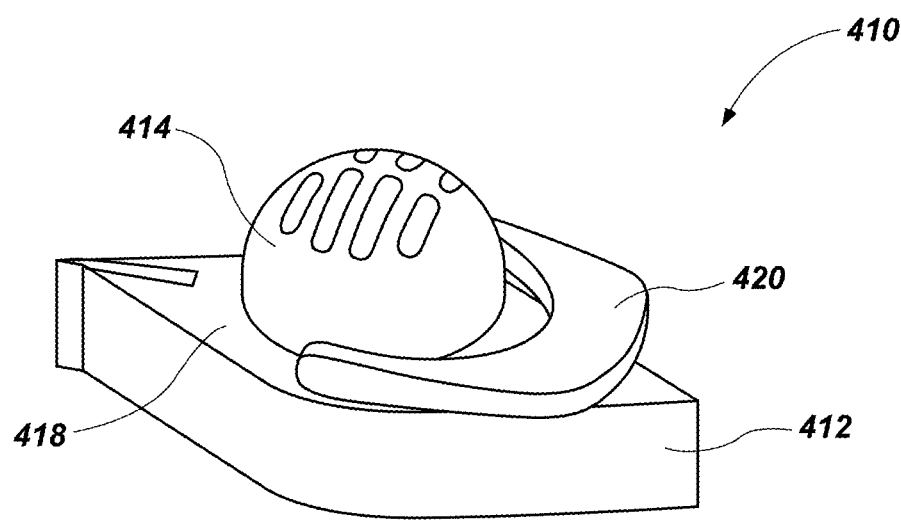
FIG. 13 is a perspective view of an alternate embodiment of a valve with a lever.

Referring to FIG. 13, an alternate embodiment of a valve system 410 is depicted with a housing 412 and a lever 420. The housing may include a ring 418 similar to previous embodiments but may be any polygonal shape. A valve may reside within the housing 412 that functions similar to any of the previous embodiments described herein. The housing 412 may include a cage 414, or pass-through, residing on the outside body of the housing 412. The cage 414 may protect the valve. The lever 420 may manipulate the interior valve by a user flipping the lever to a plurality of locations based on the desire of the user. The lever 420 may rotate about an axis 180 degrees where flipping the lever 420 to one end allows air to flow one-way into an inflatable device and flipping the lever 420 to the opposite end allows air to flow one-way out of the inflatable device. If the lever 420 is manipulated to a midway point, or any position between the two ends, it may allow for mass deflation of the inflatable device as previously described herein.

This embodiment of the valve system 410 may not be that dissimilar from the previous valve system 210 with the exception that the valve is manipulated by a lever 420 rather than the user rotating the valve 216 itself.

Figure 14:
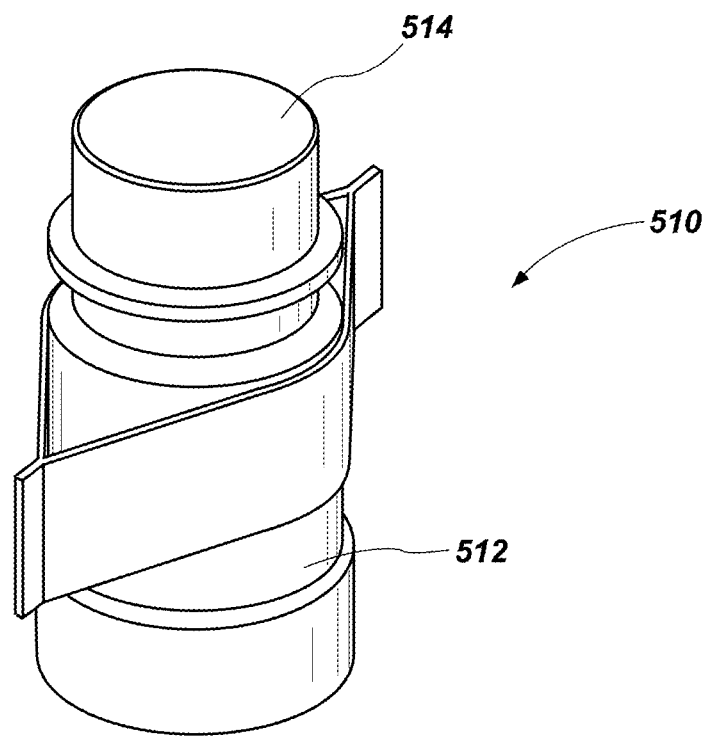
FIG. 14 is a perspective view of an alternate embodiment with a button actuator.

Referring to FIG. 14, an alternate embodiment of a valve system 510 is depicted. The valve system 510 may include a housing 512 and an actuation mechanism 514, or button. The push button 514 may manipulate a valve within the housing 512. The valve may be in a first configuration that allows air to flow one-way into an inflation device and when the button 514 is either pushed or pulled it actuates the valve to a second configuration allowing are to flow one-way out of the inflation device. Similar to the actuation of a clicking pen, the actuation mechanism 514 changes the configuration of the valve allowing air to flow only one-way, but opposite directions depending on pressing or pulling of the actuation mechanism 514.

Figure 15:
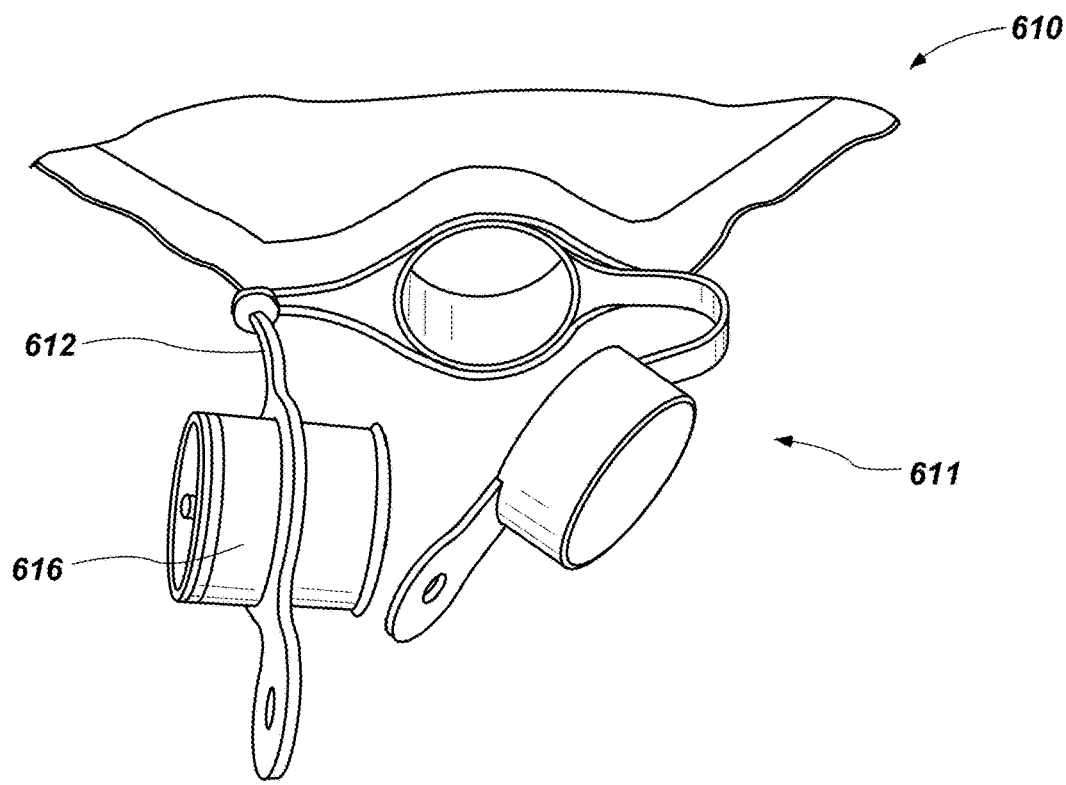
FIG. 15 is a perspective view of an alternate embodiment of a valve integrated with an inflatable element in a first configuration.
Figure 16:
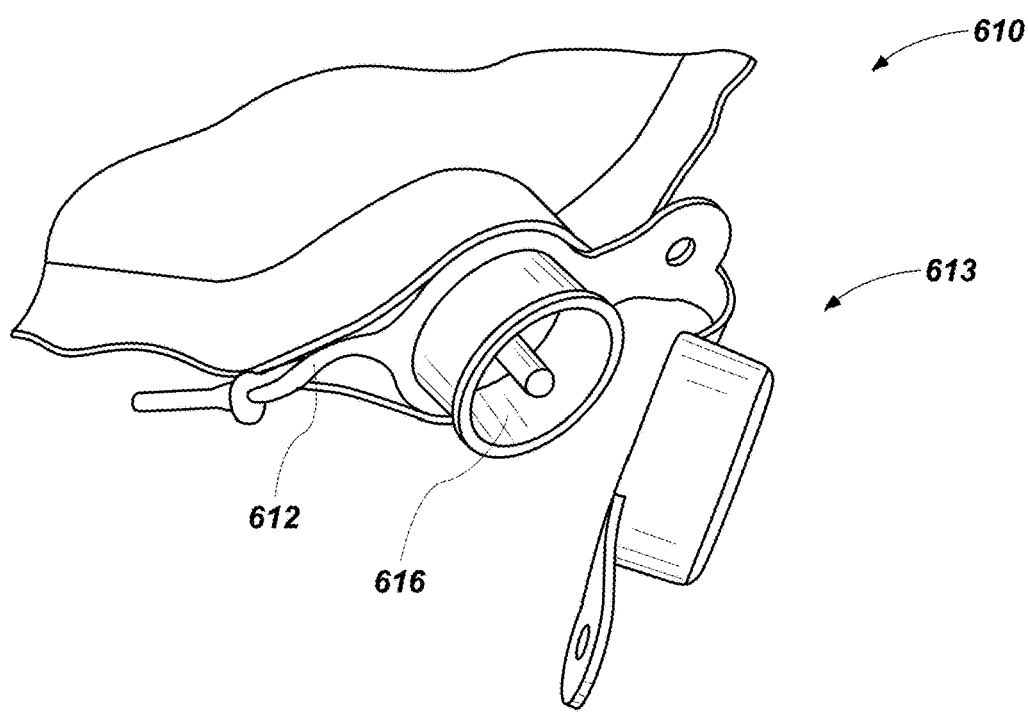
FIG. 16 is a perspective view of the alternate embodiment valve integrated with an inflatable element of FIG. 15 in a second configuration.

Referring to FIGS. 15 and 16, an alternate embodiment of a valve system 610 is depicted. The valve system 610 may include a valve 616 within a housing 612 with a first configuration 611 and a second configuration 613. The valve 616 may be physically or manually removed from the housing 612 and rotated 180 degrees and then reinserted back into the housing 612. The first configuration 611 allows for one-way air flow to deflate the inflatable device and the second configuration 613 allows for one-way air flow to inflate the inflatable device.

Materials that may be used for the housing 12 may include a polyurethane which may be weldable into an inflation device. The hardness of the polyurethane may be between 92-95. The valve 16, 116 may be comprised of a harder plastic that may engage the O-ring or the valve 16, 116 may be another material that seals against the housing 12. The cap 14 may be comprised of a similar material as the housing 12 with the flange coupling the cap 14 to the housing 12 being a more bendable plastic or rubber.

Although the foregoing disclosure provides many specifics, these should not be construed as limiting the scope any of the ensuing claims. Other embodiments may be devised which do not depart from the scopes of the claims. Features from different embodiments may be employed separately or in combination. Accordingly, all additions, deletions and modifications to the disclosed subject matter that fall within the scopes of the claims are to be embraced thereby. The scope of each claim is indicated and limited only by its plain language and the full scope of available legal equivalents to its elements.

What is claimed:

1. A valve assembly comprising:
an inflatable device;
a housing integrated with the inflatable device, the housing configured to engage a valve, the housing comprising an opening and at least one void;
a cap; and
the valve configured to rotate about an axis within the housing and perpendicular to the opening, the valve comprising:
an outer wall; and
a first stop protruding from the outer wall, the first stop configured to securely engage the at least one void of the housing.

2. The valve assembly of claim 1, wherein the housing comprises:
a spherical frustum and
wherein the at least one void is positioned within an inner wall of the housing, wherein the at least one void receives the first stop.

3. The valve assembly of claim 1, wherein the valve comprises: a first pin and a second pin, wherein the first pin engages a first cutout and the second pin engages a second cutout wherein the first and second pin are positioned on a single rotatable axis and wherein the valve is rotatable about the first and second pins; and wherein the first cutout and the second cutout are on a single axis and non-parallel with the at least one void of the housing.

4. The valve assembly of claim 3, wherein the first and second pins are reversibly secured to the housing within the first and second cutouts.

5. The valve assembly of claim 1, wherein the valve comprises a first configuration wherein air may only pass through the valve in a one-way direction into the inflatable device.

6. The valve assembly of claim 1, wherein the valve comprises a second configuration wherein air may only pass through the valve in a one-way direction out of the inflatable device.

7. The valve assembly of claim 1, wherein the outer wall of the valve seals against the inner wall of the housing.

8. The valve assembly of claim 7, wherein the outer wall comprises circumferential ridges.

9. A system comprising:
an inflatable device;
a housing integrated with a portion of a perimeter of the inflatable device, the housing comprising an opening and at least one void, and the housing configured to engage a valve;
the valve configured to rotate about an axis within the housing and non-parallel to the opening, the valve comprising:
an outer wall; and
a first stop protruding from the outer wall, the first stop configured to securely engage the at least one void of the housing.

10. The system of claim 9 comprising: a cap secured to the housing wherein the cap flexibly connected to the housing.

11. The system of claim 9, wherein the valve further comprises:
at least one opening within the valve;
a support member traversing the at least one valve opening from opposite ends of an inner wall of the valve; and
an opening cover configured to cover the entire at least one opening.

12. The system of claim 11, wherein the opening cover is secured to the support member.

13. The system of claim 9, wherein the housing comprises:
   a spherical frustum; and
   wherein the at least one void is positioned within the inner wall of the housing, wherein the at least one void receives the first stop.

14. The system of claim 9, wherein the valve comprises: a first pin and a second pin, wherein the first pin engages a first cutout and the second pin engages a second cutout wherein the first and second pin are positioned on a single rotatable axis and wherein the valve is rotatable about the first and second pins; and wherein the first cutout and the second cutout are on a single axis and non-parallel with the at least one void of the housing.

15. The valve assembly of claim 14, wherein the first and second pins are reversibly secured to the housing within the first and second cutouts.

16. The valve assembly of claim 9, wherein the valve comprises a first configuration wherein air may only pass through the valve in a one-way direction into the inflatable device.

17. The valve assembly of claim 9, wherein the valve comprises a second configuration wherein air may only pass through the valve in a one-way direction out of the inflatable device.

18. The valve assembly of claim 9, wherein the outer wall of the valve seals against an inner wall of the housing.

19. The valve assembly of claim 18, wherein the outer wall comprises circumferential ridges.

* * * * *